(12) United States Patent
Reial et al.

(10) Patent No.: US 8,275,074 B2
(45) Date of Patent: Sep. 25, 2012

(54) OFDM RECEIVER FOR DISPERSIVE ENVIRONMENT

(75) Inventors: Andres Reial, Malmö (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 780 days.

(21) Appl. No.: 12/371,971

(22) Filed: Feb. 17, 2009

(65) Prior Publication Data

US 2010/0208847 A1 Aug. 19, 2010

(51) Int. Cl.
*H03D 1/00* (2006.01)
(52) U.S. Cl. ........ 375/340; 375/260; 375/267; 375/259; 375/348; 370/210; 370/428
(58) Field of Classification Search ............... 375/267, 375/259, 260, 295, 340, 348; 370/210, 428
See application file for complete search history.

(56) References Cited

U.S. PATENT DOCUMENTS

| | | | |
|---|---|---|---|
| 2004/0086027 A1 | 5/2004 | Shattil | |
| 2004/0228272 A1* | 11/2004 | Hasegawa et al. | 370/210 |
| 2005/0201447 A1 | 9/2005 | Cairns et al. | |
| 2006/0067383 A1 | 3/2006 | Cozzo et al. | |
| 2006/0294170 A1* | 12/2006 | Matsuoka et al. | 708/300 |
| 2007/0002728 A1* | 1/2007 | Fujii et al. | 370/210 |
| 2008/0273621 A1* | 11/2008 | Manakkal et al. | 375/267 |
| 2010/0232542 A1* | 9/2010 | Miyoshi et al. | 375/295 |
| 2011/0019749 A1* | 1/2011 | Wilhelmsson et al. | 375/259 |

OTHER PUBLICATIONS

Matsuoka, H. et al. "A Smart Antenna with Pre- and Post-FFT Hybrid Domain Beamforming for Broadband OFDM System." IEEE Wireless Communications and Networking Conference, 2006 (WCNC 2006), Las Vegas, NV, US, vol. 4, Apr. 3-6, 2006, pp. 1916-1920.

* cited by examiner

*Primary Examiner* — Eva Puente
(74) *Attorney, Agent, or Firm* — Coats & Bennett, P.L.L.C.

(57) ABSTRACT

A received OFDM signal is processed to determine a plurality of reference delays, which may include the path delays of a multipath channel. The effective channel estimates corresponding to each reference delay are determined, as is the covariance of the ISI and noise components observed at each delay. Combining weights resulting in maximum post-combining SINR are determined for all subcarriers. A corresponding plurality of FFTs is applied to the incoming sample stream, one at each of the reference delays. The individual subcarriers from each FFT output are then combined using the combining weights. This produces a single FFT output with suppressed ISI, which is used in further processing.

18 Claims, 5 Drawing Sheets

OFDM RECEIVER FOR DISPERSIVE ENVIRONMENT

TECHNICAL FIELD

The present invention relates generally to wireless communication systems, and in particular to a system and method for receiving and processing Orthogonal Frequency Division Multiplexing (OFDM) signals in a dispersive environment.

BACKGROUND

OFDM is the radio access technology selected for a number of modern wireless communications systems, e.g., WiFi, 3GPP LTE, WiMax, and the like. The main idea of OFDM is to transmit a number of narrow-band symbols in parallel in the frequency domain, which are efficiently converted to and from the corresponding time-domain waveform using Inverse Fast Fourier Transform and Fast Fourier Transform (IFFT/FFT) operations. Since each individual sub-carrier is narrow-band, the symbols are also relatively robust against frequency-selective fading, or dispersion (also known as multipath interference) in the propagation channel. For moderate multipath, even if the overall signal frequency band exhibits fading dips, the channel remains approximately flat for each symbol over its narrow frequency band, limiting the inter-symbol interference (ISI) to sufficiently low levels for acceptable results.

In order to improve the multipath robustness further, a cyclic prefix (CP) may be introduced, by prepending a copy of the last part of the time-domain OFDM symbol to the beginning of that symbol prior to transmission. Using the CP eliminates the ISI altogether, if the channel dispersion is shorter than the length of the CP, as well known in the art.

A baseline OFDM receiver structure 10 is depicted in FIG. 4. OFDM signals are received at one or more antennas 12, and processed by a front end receiver circuit 14, which may include low-noise amplification, frequency down-conversion, analog filtering, and the like. The signal is digitized by an analog-to-digital converter (ADC) 16, and baseband filtered by a digital filter 18. A timing reference is established, for example using the CP properties or known synchronization signals, and provided to a Fast Fourier Transform (FFT) processor 20. A length-N sample sequence, starting at the timing reference, is then processed by the FFT 20. The individual carriers are de-rotated to undo the per-carrier channel impact in channel estimation block 22, and the transmitted symbols are recovered by symbol detector 24.

When OFDM transmission is attempted over heavily dispersive channels, the resulting ISI may not be negligible, despite the degree of robustness built into the OFDM scheme. This result may occur even when the CP is applied. The length of the CP in a practical system is limited, since it is chosen as a compromise between providing protection in "typical" scenarios and minimizing the "wasted" transmission energy that does not directly improve the available data rates or coverage. Especially the Single Frequency Network (SFN) or Coordinated Multi-Point (CoMP) deployments, where several cell sites cooperate in transmitting the same signal, will give rise to effective multipath channels with very large delay spreads, even if each individual channel would be quite compact.

Thus, there are practical propagation scenarios where the delay spread will exceed the CP and introduce ISI in OFDM. When attempting transmission at high coding rates, even moderate ISI will be detrimental and limit the data rates experienced by the user. Simply extending the length of the CP is undesirable, as the CP is redundant information, the transmission of which consumes air interface bandwidth without contributing to the data transfer.

SUMMARY

A received OFDM signal is processed to determine a plurality of reference delays, which may include the path delays of a multipath channel, as well as other delays not corresponding to the propagation paths. The effective channel estimates corresponding to each reference delay are determined, as is the covariance of the ISI and noise components observed at each delay. Combining weights resulting in maximum post-combining SINR are determined for all subcarriers. A corresponding plurality of FFTs is applied to the incoming sample stream, one at each of the reference delays. The individual subcarriers from each FFT output are then combined using the combining weights. This produces a single FFT output with suppressed ISI, which may be used in all further processing. Alternatively, the multiple FFT outputs may be combined in later stages of baseband processing.

One embodiment of the invention relates to a method of processing a received OFDM signal in a wireless communication receiver. The OFDM signal is received at one or more antennas. At least two reference delays are determined per OFDM symbol in the received signal. The received signal is FFT processed at each determined reference delay, to generate at least two sets of frequency domain samples. Channel and interference estimates are generated for each set of frequency domain samples. Combining weights are determined, based on the channel and interference estimates, to generate the maximum post-combining SINR. The at least two sets of frequency domain samples are combined using the combining weights, and symbols are detected from the combined frequency domain samples.

Another embodiment of the invention relates to an OFDM receiver. The receiver includes one or more antennas operative to receive an OFDM signal and a timing control unit operative to generate a plurality of FFT processing reference delays. The receiver also includes an FFT processor operative to FFT process the received signal at two or more reference delays, to generate two or more sets of frequency domain samples, in response to the timing control unit. The receiver further includes a channel and covariance estimator operative to generate channel and covariance estimates for each set of frequency domain samples, and a symbol detector operative to generate combining weights that yield a maximum post-combining SINR, and combine the sets of frequency domain samples based on the combining weights to detect OFDM symbols.

DETAILED DESCRIPTION

Notation and Channel Model

Figure 1:
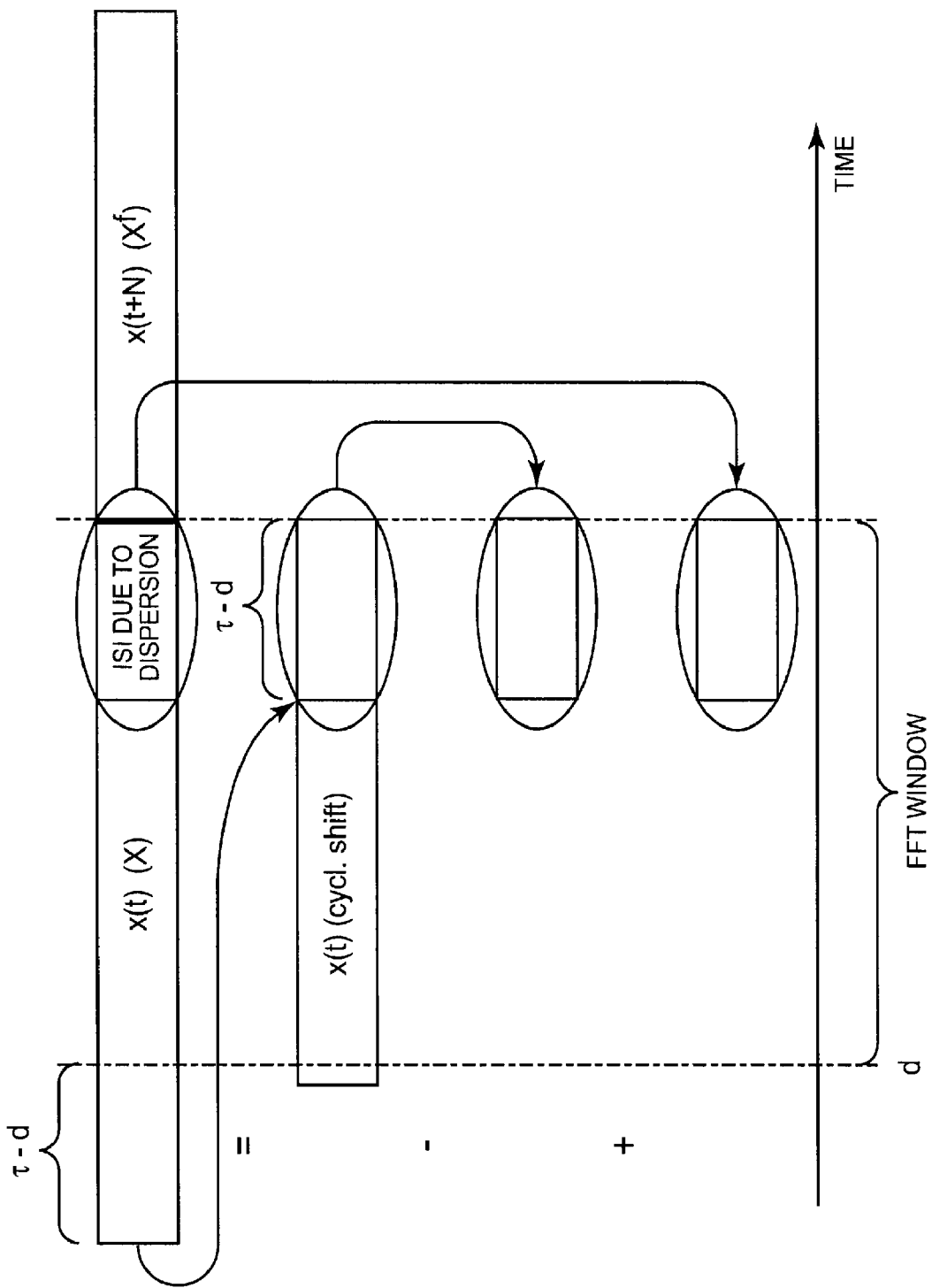
FIG. 1 is a timing diagram depicting a conceptual approach to OFDM processing according to embodiments of the present invention.

Consider an OFDM transmission system with symbol length N and, for simplicity of explanation, no CP. Let the current symbol of interest X contain N per-subcarrier symbols $X_n$. Denote the preceding and following symbols by $X^p$ and $X^f$, respectively. The corresponding transmitted waveform for the desired symbol is then given by the IFFT:

$$x_n = \frac{1}{N}\sum_{k=0}^{N-1} Q_N^{-kn} X_k$$

where $$Q_N = e^{\frac{j2\pi}{N}}.$$

Let the propagation channel consist of M paths at delays $\tau_m$, m=1 ... M and with complex channel coefficients $g_m$. Finally, let the set of reference delays for receiver FFT input sample sequence alignment be $d_i$, i=1 ... F.

The received signal will be a sum of the multiple scaled and shifted copies plus noise:

$$y_n = \sum_{m=1}^{M} g_m x_{n-\tau_m} + v_n.$$

Denote $E|x_n|^2 = E_c$ and $E|v_n|^2 = N_0$.

Receiver Operation

If the channel consists of a single path, the original symbols would be perfectly recovered by an FFT placed at the delay $\tau_1$:

$$Y_k = \sum_{n=0}^{N-1} Q_N^{kn} y_n = X_k$$

However, in the presence of multipath signal components, the other shifted copies of the signal will interfere. In order to suppress this interference, embodiments of the present invention perform FFTs at different reference delays and account for the fact that the interference components will be correlated. This offers redundancy which may be used to suppress the undesired signal components by the interference rejection combining (IRC) principle.

Denote the FFT performed at reference delay i for sub-carrier k by $Y_k^{(i)}$. A useful model of an imperfectly aligned sample sequence is demonstrated graphically in FIG. 2. The signal falling in the FFT window at delay d includes most, but not all, of a first symbol, and the leading portion of a following symbol (identified as ISI). This may be modeled as (i.e., equals) the FFT of the original sample sequence circularly shifted by the offset, then removing (subtracting) the wrapped-around part and replacing it with (adding) the interfering part of the following (or preceding) symbol. The FFT performed at reference delay i for sub-carrier k can thus be expressed using the structure:

$$Y_k^{(i)} = \left(\sum_{m=1}^{M} g_m Q_N^{k(\tau_m-d_i)}\right) X_k + \sum_{m=1}^{M} g_m B(\tau_m, d_i) + V_k^{(i)}$$

where the first term is the desired signal, the second term is the ISI, and the third term is noise. The per-path ISI term has the following structure:

$$B(\tau_m, d_i) = \begin{cases} \sum_{n=0}^{\Delta_{mi}-1} (x^p_{N-(\Delta_{mi}-n)} - x_{N-(\Delta_{mi}-n)}) Q_N^{kn}, & \Delta_{mi} > 0 \\ \sum_{n=0}^{\Delta_{mi}-1} (x^f_n - x_n) Q_N^{k(N-(\Delta_{mi}-n))}, & \Delta_{mi} < 0 \\ 0 & \Delta_{mi} = 0 \end{cases}$$

where $\Delta_{mi} = \tau_m - d_i$. For the given channel realization, the optimal linear combination of the available FFT outputs for sub-carrier k, $Y_k^{(i)}$ is given by:

$$Y_k = \sum_{i=1}^{F} W_k^{(i)*} Y_k^{(i)}$$

or, in vector form, $$Y_k = W_k^H Y_k.$$

Combining Weight Computation

The combining weights must satisfy $$R_k W_k = G_k,$$

where $G_k$ is the frequency-domain channel vector for sub-carrier k, and $R_k$ is the covariance matrix for sub-carrier k.

The determination of $G_k$ and $R_k$ is outlined below. A practical receiver may compute the weights by solving the required LSE using a variety of known techniques, or by explicitly inverting the covariance matrix:

$$W_k = R_k^{-1} G_k.$$

Channel Coefficient Calculation

The coefficient column vector $G_k$ has elements $$G_k^{(i)} = E[Y_k^{(i)}] = \sum_{m=1}^{M} g_m Q_N^{k(\tau_m-d_i)}.$$

The receiver may correlate to known synchronization signals, e.g., P-SCH, S-SCH in the case of a 3GPP LTE system, to determine the path delays $\tau_m$. The medium channel coefficients $g_m$ may then be found by computing the IDFT of samples of interest of the frequency domain channel estimates. Alternatively, the peak positions may be found by performing a full IFFT of the channel estimates in the frequency domain and detecting the peaks.

Covariance Matrix Calculation

The covariance matrix may be decomposed according to the form $$R_k = E[(Y_k - EY_k)(Y_k - EY_k)^H] = R_{ISI,k} + R_{N,k}$$

The ISI term has elements $$R_{ISI,k}(d_i, d_j) = \sum_{m=1}^{M} \sum_{l=1}^{M} g_m g_m^* E(B(\tau_m, d_i) B^*(\tau_l, d_j))$$

Denoting again $\Delta_{mi} = \tau_m - d_i$ and $\Delta_{lj} = \tau_l - d_j$, yields $$R_{ISI,k}(d_i, d_j) = \sum_{m=1}^{M} \sum_{l=1}^{M} g_m$$

$$g_l^* \cdot \begin{cases} 2E_c Q_N^{k(\Delta_{lj} - \Delta_{mi})} \cdot \min(|\Delta_{mi}|, |\Delta_{lj}|), & \text{sgn}(\Delta_{mi}) = \text{sgn}(\Delta_{lj}) \\ E_c Q_N^{k(\Delta_{lj} + \Delta_{mi})} \cdot \max(|\Delta_{mi} - \Delta_{lj}| - N, 0), & \text{sgn}(\Delta_{mi}) \neq \text{sgn}(\Delta_{lj}) \\ 0 & \Delta_{mi} = 0 \text{ or } \Delta_{lj} = 0 \end{cases}$$

Regarding the noise term, $$R_{N,k}(d_i, d_j) = E[V_k V_k^H] = N_0 Q_N^{k(d_i - d_j)} \cdot \max(|d_i - d_j| - N, 0)$$

The covariance may be estimated via the construction above, with the scaling parameters $E_c$ and $N_0$ known from other receiver processing stages, or estimated using known parameter estimation routines. Alternatively, the covariance may be estimated blindly (non-parametrically) from the data, using the pilot symbols from the FFTs corresponding to each reference delay.

Figure 2:
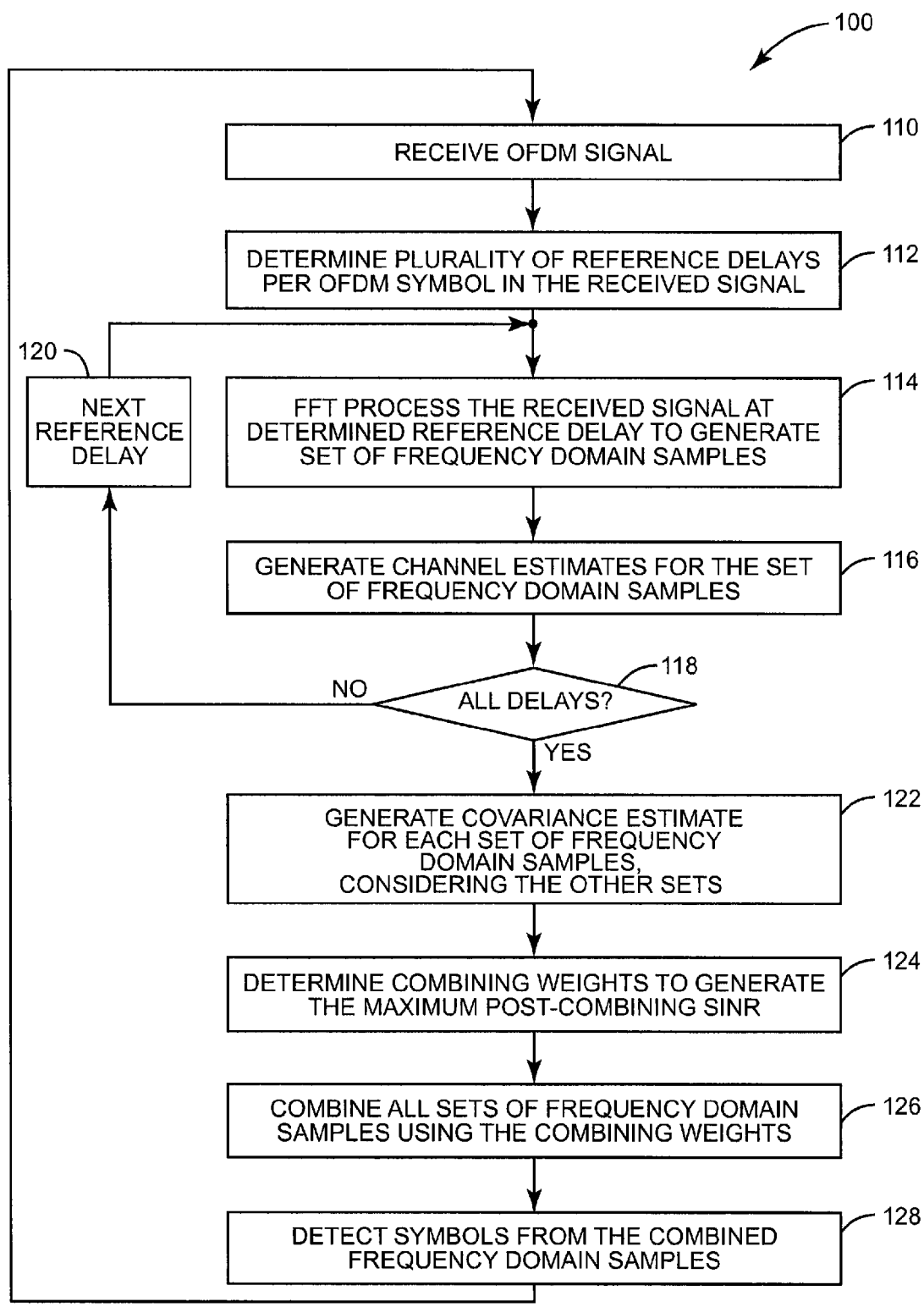
FIG. 2 is a flow diagram depicting a method of processing OFDM signals in a dispersive environment according to embodiments of the present invention.
Figure 3:
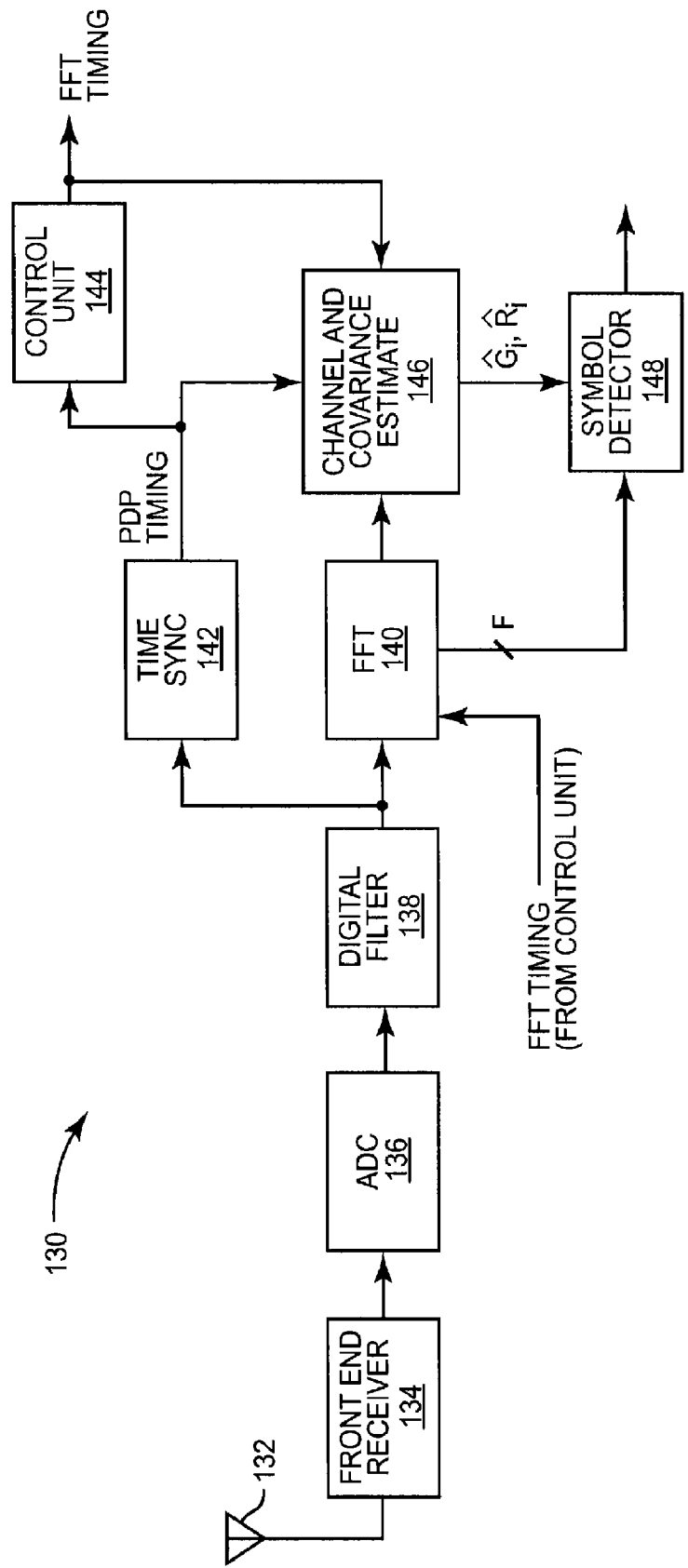
FIG. 3 is a functional block diagram of an OFDM receiver for processing OFDM signals in a dispersive environment according to embodiments of the present invention.
Figure 4:
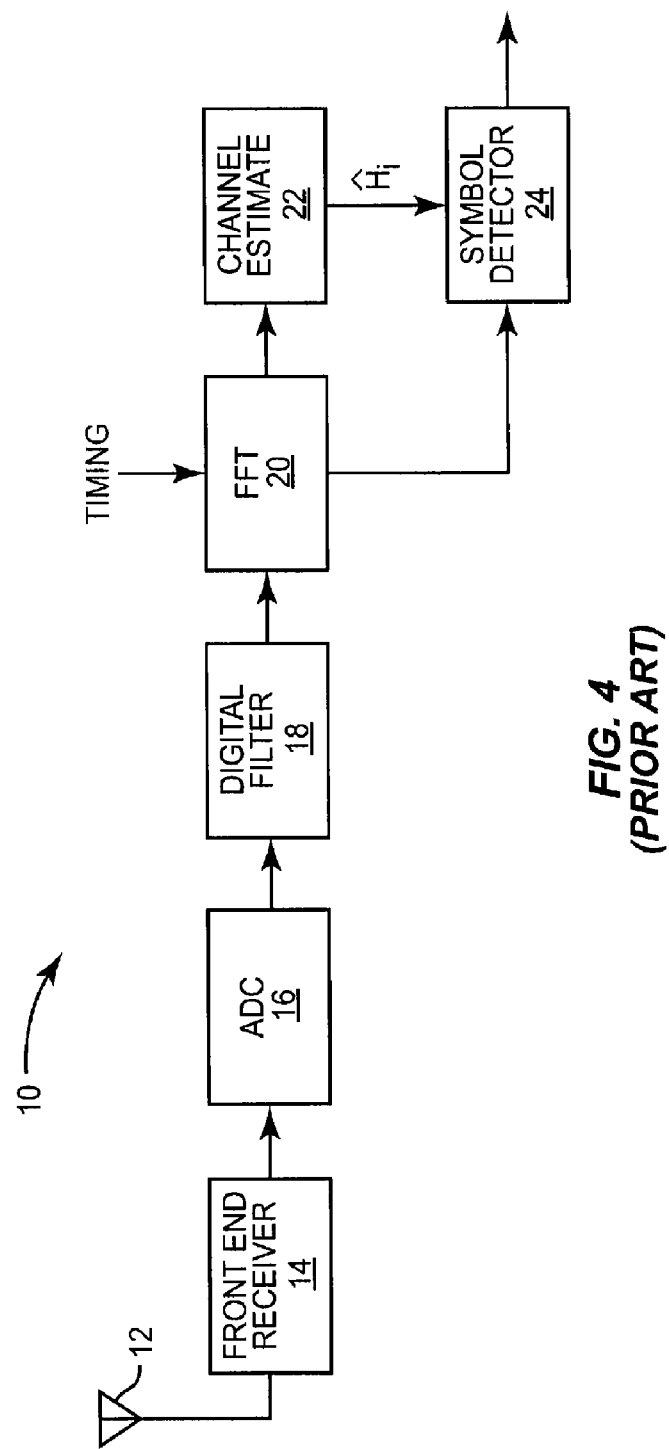
FIG. 4 is a functional block diagram of a prior art OFDM receiver.

FIG. 2 depicts a method 100 of receiving and processing OFDM signals, and FIG. 3 depicts a receiver architecture 130 for practicing the method 100. OFDM signals are received at one or more antennas 132 (step 110). The received signals are processed in a front end receiver circuit 134, which may include, e.g., low-noise amplification, frequency down-conversion, analog filtering, and the like. The signal is digitized by an analog-to-digital converter (ADC) 136, and baseband filtered by a digital filter 138. A plurality of reference delays for each OFDM symbol from each antenna 132, which may for example take the form of a Path Delay Profile, is determined in a time synchronization circuit 142 (step 112). The PDP may determined, e.g., by correlation to synchronization signals or reference signals. The PDP is received by a control unit 144 that determines FFT sampling instances.

The received signal is processed by an FFT processor 140 at the determined FFT timing instances (step 114). The resulting sets of frequency domain samples for all sub-carriers are stored in a buffer, and utilized by a channel and covariance estimation unit 146 to produce channel estimates for each set of frequency domain samples (step 116). The FFT processing and channel estimation is performed for all identified FFT sampling delays (steps 118, 120). The block 146 additionally calculates covariance estimates for each set of frequency domain samples (step 122), which are correlated with the other sets of frequency domain samples. Combining weights are formed (step 124). In one embodiment of the invention, the combining weights are based on the channel and interference estimates, and may be, for example, the weights that will yield the maximum post-combining SINR. All of the sets of frequency domain samples are combined using the combining weights (step 126). The symbols are then detected from the combined signal in the symbol detector block 148 (step 128).

For the sake of simplicity of illustration, the discussion herein has assumed no CP is used in the OFDM symbols; The delay spread does not exceed the symbol length N; noise is temporally uncorrelated; and the receiver 130 utilizes a single antenna 132. However, those of skill in the art will readily realize that the present invention is not limited by these assumptions, and may readily derive the required corrections to the combining weight computation process under different conditions, given the teaching of the present disclosure.

In one embodiment of the invention, the placement of the reference delays may be a superset of detected path delays, with additional reference delays chosen to provide useful information for ISI suppression.

Some exemplary values for the FFT parameters may be N=128, 256, 512, 1024 or 2048.

Embodiments of the present invention may be applied as a pre-processing step to a state-of-the-art OFDM receiver, where all subsequent baseband processing remains unchanged. Alternatively, the extended set of FFT outputs may be made available to the equalization and/or spatial combination stages, replacing the original $N_{rx}$-element operations with their larger equivalents, using the described covariance relationships.

Embodiments of the present invention exhibit some conceptual similarities to the GRAKE receiver structure applied to WCDMA. Accordingly, a number of extensions and variants developed in the GRAKE context are applicable to embodiments of the present invention, and may provided improved performance and/or computational simplicity. These include, e.g., techniques of reference delay selection; fitting parameter estimation; numerically robust combining weight computation; and the like.

Embodiments of the present invention provide OFDM operation with improved robustness in heavy multipath without requiring excessively long CPs. Indeed, embodiments of the present invention may allow operation of OFDM without the use of CPs, eliminating the overhead of transmitting the CP over the air interface. Suppressing ISI removes (or at least elevates) the achievable effective SINR ceiling at higher geometries. Improved user throughput, high-rate coverage, and/or network capacity is achieved as a result.

Figure 5:
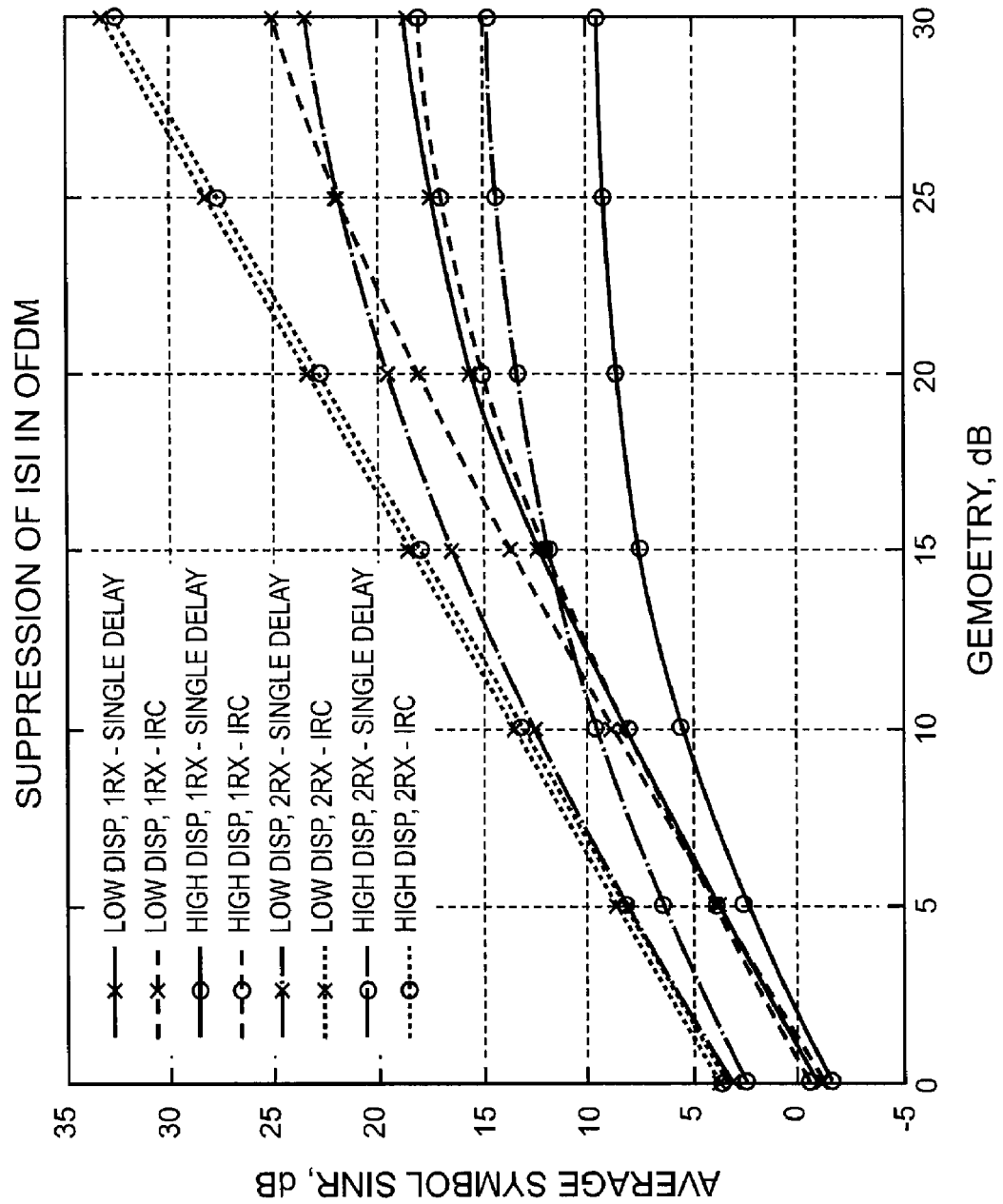
FIG. 5 is a graph of the Inter-Symbol Interference (ISI) suppression via interference rejection combining (IRC) on two-tap multipath channels, for both single- and dual-antenna receivers.

FIG. 5 depicts some examples of ISI suppression via interference rejection combining (IRC) on two-tap multipath channels, for both single- and dual-antenna receivers. The FFT length is N=128. The low-dispersion channels have paths at 2 and 4, and 4 FFTs at sampling instances 0, 2, 4, and 6 are combined. The high-dispersion channels have paths at 20 and 40, and the FFT sampling instances are 0, 20, 40, and 60. Improvement is seen in all medium-to-high geometry scenarios.

Those of skill in the art will readily recognize that elements depicted in FIG. 3 as functional blocks, such as the digital filter 138, FFT processor 140, timing synchronization unit 142, control unit 144, channel and covariance estimator 146, and symbol detector 148 may be implemented as analog or digital hardware circuits, as programmable logic coupled with appropriate firmware, or as software modules executing one or more a general-purpose processors or Digital Signal Processors (DSP). Furthermore, any or all of the functional blocks may be merged, and/or functionality included in one block may be separated into two or more functional blocks. Similarly, the method steps depicted in FIG. 2 may be merged or separated, and one or more steps may be omitted and/or additional steps added, in any particular implementation.

The present invention may, of course, be carried out in other ways than those specifically set forth herein without departing from essential characteristics of the invention. The present embodiments of the invention are to be considered in all respects as illustrative and not restrictive, and all changes coming within the meaning and equivalency range of the appended claims are intended to be embraced therein.

What is claimed is:

1. A method of processing a received Orthogonal Frequency Division Multiplexing (OFDM) signal in a wireless communication receiver, comprising:
   receiving the OFDM signal at one or more antennas;
   determining at least two reference delays per OFDM symbol per receiver antenna in the received signal;
   Fast Fourier Transform (FFT) processing the received signal at each determined reference delay to generate at least two sets of frequency domain samples;
   determining combining weights for the sets of frequency domain samples;
   combining the at least two sets of frequency domain samples using the combining weights; and
   detecting symbols from the combined frequency domain samples.

2. The method of claim 1 further comprising generating channel and interference estimates for each set of frequency domain samples, and wherein determining combining weights comprises determining combining weights based on the channel and interference estimates.

3. The method of claim 1 wherein determining combining weights for the sets of frequency domain samples comprises determining the combining weights that generate the maximum post-combining Signal to Interference and Noise Ratio (SINR).

4. The method of claim 1 wherein determining at least two reference delays per OFDM symbol in the received signal comprises evaluating a radio channel profile and detecting peaks in the radio channel profile.

5. The method of claim 4 wherein the radio channel profile comprises a path delay profile (PDP).

6. The method of claim 5 wherein determining at least two reference delays per OFDM symbol in the received signal further comprises adding additional delays based on the PDP.

7. The method of claim 1 wherein FFT processing the received signal at each determined reference delay comprises modeling a symbol within an FFT sampling window offset by the delay as the FFT of the original sample sequence circularly shifted by the offset, then removing the wrapped-around part and replacing it with the interfering portion of an adjacent symbol.

8. The method of claim 7 wherein the FFT within the sampling window is given by:

$$Y_k^{(i)} \left( \sum_{m=1}^{M} g_m Q_N^{k(\tau_m - d_i)} \right) X_k + \sum_{m=1}^{M} g_m B(\tau_m, d_i) + V_k^{(i)}$$

where $Y_k^{(i)}$ is the FFT performed at reference delay i, the first term is the desired symbol, the second term is the ISI, and the third term is noise.

9. The method of claim 8 wherein the per-path ISI term has the structure:

$$B(\tau_m, d_i) = \begin{cases} \sum_{n=0}^{\Delta_{mi}-1} (x_{N-(\Delta_{mi}-n)}^p - x_{N-(\Delta_{mi}-n)}) Q_N^{kn}, & \Delta_{mi} > 0 \\ \sum_{n=0}^{\Delta_{mi}-1} (x_n^f - x_n) Q_N^{k(N-(\Delta_{mi}-n))}, & \Delta_{mi} < 0 \\ 0 & \Delta_{mi} = 0 \end{cases}$$

where $\Delta_{mi} = \tau_m - d_i$.

10. The method of claim 1 wherein generating interference estimates for each set of frequency domain samples comprises generating an interference covariance matrix for each set of frequency domain samples, based on at least one other set of frequency domain samples.

11. The method of claim 2 wherein determining combining weights based on the channel and interference estimates comprises satisfying:

$$W_k = R_k^{-1} G_k,$$

where $W_k$ are the combining weights for sub-carrier k,
$G_k$ is the frequency-domain channel vector for sub-carrier k, and
$R_k$ is the covariance matrix for sub-carrier k.

12. The method of claim 1 wherein generating channel estimates comprises estimating a time-domain channel profile and applying Fast Fourier Transforms (FFT) to produce frequency domain coefficients.

13. An Orthogonal Frequency Division Multiplexing (OFDM) receiver, comprising:
   one or more antennas operative to receive an OFDM signal;
   a timing control unit operative to generate a plurality of FFT processing reference delays;
   a Fast Fourier Transform (FFT) processor operative to FFT process the received signal at two or more reference delays, to generate two or more sets of frequency domain samples, in response to the timing control unit; and
   a symbol detector operative to generate combining weights, and to combine the sets of frequency domain samples based on the combining weights to detect OFDM symbols.

14. The receiver of claim 13 further comprising a channel and covariance estimator operative to generate channel and covariance estimates for each set of frequency domain samples; and wherein the symbol detector is operative to generate combining weights that yield a maximum post-combining Signal to Interference and Noise Ratio (SINR).

15. The receiver of claim 13 further comprising front end processing circuits interposed between the antenna and the FFT processor, and operative to down-convert and digitize the received signal.

16. The receiver of claim 13 wherein the timing control unit comprises:
   a timing synchronization unit operative to generate a Path Delay Profile (PDP) for the received signal; and
   a control unit receiving the PDP and operative to generate FFT processing reference delays.

17. The receiver of claim 16 wherein the timing synchronization unit is further operative to generate additional delays based on the PDP.

18. The receiver of claim 13 wherein the FFT processor is operative to model a symbol within an FFT sampling window offset by a reference delay as the FFT of the original sample sequence circularly shifted by the offset, then removing the wrapped-around part and replacing it with the interfering portion of an adjacent symbol.

* * * * *